(12) United States Patent
Hori et al.

(10) Patent No.: US 10,699,400 B2
(45) Date of Patent: Jun. 30, 2020

(54) IMAGE PROCESSING APPARATUS, IMAGE PROCESSING METHOD, AND STORAGE MEDIUM

(71) Applicant: CANON KABUSHIKI KAISHA, Tokyo (JP)

(72) Inventors: Shinjiro Hori, Yokohama (JP); Tohru Ikeda, Yokohama (JP); Tetsuya Suwa, Yokohama (JP); Tomokazu Ishikawa, Yokohama (JP); Wakako Tanaka, Inagi (JP)

(73) Assignee: Canon Kabushiki Kaisha, Tokyo (JP)

( * ) Notice: Subject to any disclaimer, the term of this patent is extended or adjusted under 35 U.S.C. 154(b) by 303 days.

(21) Appl. No.: 15/493,437

(22) Filed: Apr. 21, 2017

(65) Prior Publication Data

US 2017/0309011 A1 Oct. 26, 2017

(30) Foreign Application Priority Data

Apr. 25, 2016 (JP) ................................ 2016-087231

(51) Int. Cl.
*G06T 7/00* (2017.01)
*H04N 7/18* (2006.01)
(Continued)

(52) U.S. Cl.
CPC ............ *G06T 7/0004* (2013.01); *G06T 7/001* (2013.01); *G06T 7/11* (2017.01); *G06T 7/38* (2017.01);
(Continued)

(58) Field of Classification Search
CPC .......... G06T 7/0004; G06T 7/001; G06T 7/11
See application file for complete search history.

(56) References Cited

U.S. PATENT DOCUMENTS 6,356,300 B1 * 3/2002 Shiba ............... G01N 21/95607
348/130
6,539,106 B1 * 3/2003 Gallarda ............. G01R 31/307
382/149

(Continued)

FOREIGN PATENT DOCUMENTS

CN 105510333 A 4/2016
JP 2006105791 A * 4/2006

(Continued)

OTHER PUBLICATIONS

Aoki, Kimiya et al. "Performance Verification of "Kizuki" Processing via Real Industrial Parts", Vision Engineering Workshop, OS4-H4 (ISA-A4), The Japan Society for Precision Engineering, 2013.

(Continued)

*Primary Examiner* — Mainul Hasan
(74) *Attorney, Agent, or Firm* — Venable LLP

(57) ABSTRACT

An image processing apparatus acquires a work inspection image by image-taking one inspection object, acquires a work reference image that is different from the work inspection image, generates an aligned image by arranging the work reference image at the periphery of the work inspection image and subjects the aligned image to singular portion detection processing to detect a singular portion in the aligned image. The singular portion detection processing is performed on a first work inspection image obtained by image-taking a first inspection object, subsequently the singular portion detection processing is performed on a second work inspection image obtained by image-taking, after the first inspection object, a second inspection object, and subsequently the singular portion detection processing is performed on a third work inspection image obtained by image-taking, after the second inspection object, a third inspection object.

19 Claims, 11 Drawing Sheets

(51) Int. Cl.
*G06T 7/38* (2017.01)
*G06T 7/11* (2017.01)

(52) U.S. Cl.
CPC ... *H04N 7/183* (2013.01); *G06T 2207/10016* (2013.01); *G06T 2207/10024* (2013.01); *G06T 2207/20021* (2013.01); *G06T 2207/20076* (2013.01); *G06T 2207/30164* (2013.01)

(56) References Cited

U.S. PATENT DOCUMENTS

| | | | |
|---|---|---|---|
| 6,578,188 B1 * | 6/2003 | Pang | G03F 7/70441 |
| | | | 716/52 |
| 6,608,926 B1 | 8/2003 | Suwa et al. | |
| 6,694,051 B1 | 2/2004 | Yamazoe et al. | |
| 6,904,181 B1 | 6/2005 | Shinbata et al. | |
| 7,432,985 B2 | 10/2008 | Ishikawa et al. | |
| 7,616,823 B2 | 11/2009 | Ishikawa | |
| 7,924,469 B2 | 4/2011 | Ono et al. | |
| 7,944,588 B2 | 5/2011 | Yamada et al. | |
| 8,008,562 B2 | 8/2011 | Ikeda et al. | |
| 8,175,155 B2 | 5/2012 | Suwa et al. | |
| 8,237,991 B2 | 8/2012 | Ono et al. | |
| 8,405,876 B2 | 3/2013 | Nakatani et al. | |
| 8,472,076 B2 | 6/2013 | Ikeda | |
| 8,620,105 B2 | 12/2013 | Hori et al. | |
| 9,052,742 B2 | 6/2015 | Hori et al. | |
| 9,088,753 B2 | 7/2015 | Akiba et al. | |
| 9,135,523 B2 | 9/2015 | Kato et al. | |
| 9,189,681 B2 | 11/2015 | Kunieda et al. | |
| 9,232,109 B2 | 1/2016 | Suwa et al. | |
| 9,275,270 B2 | 3/2016 | Suwa et al. | |
| 9,386,186 B2 | 7/2016 | Mochizuki et al. | |
| 10,094,658 B2 | 10/2018 | Takagi et al. | |
| 2001/0053245 A1 * | 12/2001 | Sakai | G01N 21/95607 |
| | | | 382/151 |
| 2004/0264759 A1 * | 12/2004 | Hattori | G06T 7/001 |
| | | | 382/145 |
| 2007/0177787 A1 * | 8/2007 | Maeda | G06K 9/00557 |
| | | | 382/141 |
| 2008/0036899 A1 * | 2/2008 | Yamashita | G01N 21/95607 |
| | | | 348/340 |
| 2009/0290783 A1 * | 11/2009 | Sakai | G01N 21/9501 |
| | | | 382/149 |
| 2011/0194752 A1 * | 8/2011 | Pang | G03F 1/84 |
| | | | 382/149 |
| 2012/0268759 A1 | 10/2012 | Ono et al. | |
| 2013/0070078 A1 * | 3/2013 | Takagi | G06T 7/001 |
| | | | 348/80 |
| 2013/0336575 A1 * | 12/2013 | Dalla-Torre | G06T 7/001 |
| | | | 382/149 |
| 2014/0314281 A1 * | 10/2014 | Kojima | G06T 7/0008 |
| | | | 382/112 |
| 2015/0243000 A1 | 8/2015 | Hori et al. | |
| 2017/0006185 A1 | 1/2017 | Yanai et al. | |
| 2017/0322021 A1 | 11/2017 | Takagi et al. | |

FOREIGN PATENT DOCUMENTS

| | | |
|---|---|---|
| JP | 2013-185862 A | 9/2013 |
| WO | 2016/039041 A1 | 3/2016 |

OTHER PUBLICATIONS

Oct. 30, 2019 Chinese Official Action in Chinese Patent Appln. No. 20170265477.6.

Shinjiro Hori, et al. U.S. Appl. No. 15/494,635 filed Apr. 24, 2017.

* cited by examiner

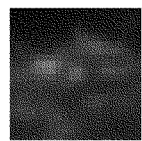
FIG.8
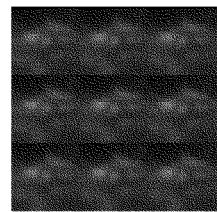 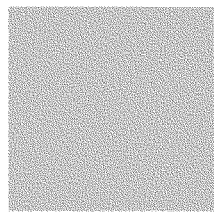
FIG.9A　　FIG.9B

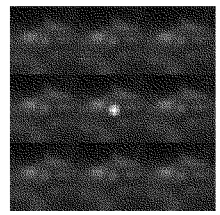 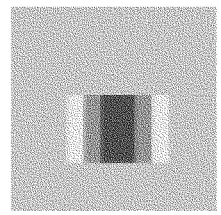
FIG.10A  FIG.10B
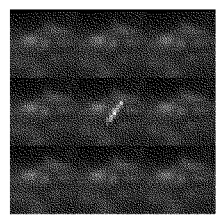 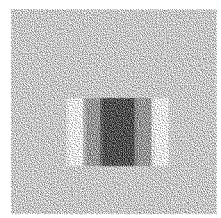
FIG.11A  FIG.11B
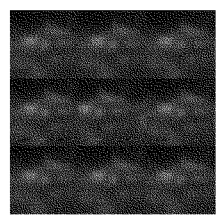 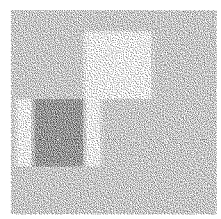
FIG.12A  FIG.12B

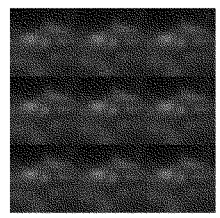 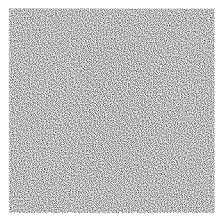
FIG.14A  FIG.14B
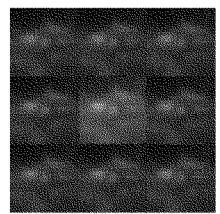 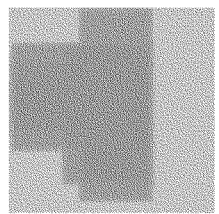
FIG.15A  FIG.15B

IMAGE PROCESSING APPARATUS, IMAGE PROCESSING METHOD, AND STORAGE MEDIUM

BACKGROUND OF THE INVENTION

Field of the Invention

The present invention relates to an image processing apparatus and an image processing method to detect a defect (singular portion) in an inspection object.

Description of the Related Art

Japanese Patent Laid-Open No. 2013-185862 discloses an algorithm to detect a defect of an inspection object based on a human visual mechanism. The processing disclosed in Japanese Patent Laid-Open No. 2013-185862 will be herein referred to as a processing of peripheral vision and involuntary eye movement during fixation. The use of the processing of peripheral vision and involuntary eye movement during fixation provides the effective extraction or exposure of the defect of the inspection object without the human gaze.

On the other hand, "Performance Verification of "KIZUKI" Processing via Real Industrial Parts" Vision Engineering Workshop (ViEW2013), OS4-H4(IS2-A4), The Japan Society For Precision Engineering (2013) (hereinafter referred to as the above Nonpatent Document) discloses a method by which, in order to detect a defective product from a plurality of objects, inspection target regions are image-taken with regard to each of the plurality of objects to connect the resultant images to generate an aligned image and the aligned image is subjected to the above processing of peripheral vision and involuntary eye movement during fixation. The use of the above Nonpatent Document can provide the extraction of an object having a singular portion (defect) different from those of a plurality of objects in a relatively-simple manner.

However, if the method of the above Nonpatent Document is used in an article inspection step of a manufacture line, then the image taking and an output of the result of the inspection with respect to an arbitrary object is not obtained in a realtime manner, thus causing a case where a sequential inspection is difficult. The following section will describe this in a specific manner.

In a case where a plurality of objects continuously carried in the manufacture line are sequentially inspected using a fixed camera, the image taking by the camera is performed based on a cycle depending on a speed at which the objects are carried and the resultant images are subjected to a predetermined image processing. However, the use of the above Nonpatent Document causes the image processing to one object that requires not only an image obtained by image-taking the object but also images of other plurality of objects. For this reason, in order to inspect one object, not only the time for a step of image-taking the object but also the time for a step of image-taking other plurality of objects are required. This consequently causes the inspection result for an arbitrary object to be outputted after a plurality of image-taking steps, which may cause a risk of a slower response to the inspection and a speed slower than realtime.

SUMMARY OF THE INVENTION

The present invention has been made in order to solve the above disadvantage. Thus, it is an objective of the invention to provide an image processing apparatus according to which, in a processing of sequentially image-taking a plurality of objects image-taken to inspect the objects, the inspection result can be outputted with a high response to the image-taking operation of the individual objects.

According to a first aspect of the present invention, there is provided an image processing apparatus, comprising: a unit configured to acquire a work inspection image of one inspection object among a plurality of sequentially image-taken objects; a unit configured to acquire a work reference image that is different from the work inspection image and used to inspect the one inspection object; a unit configured to generate an aligned image by arranging the work reference image at the periphery of the work inspection image; and a processing unit configured to subject the aligned image to singular portion detecting processing to detect a singular portion in the aligned image, wherein the processing unit performs the singular portion detection processing on a first work inspection image obtained by image-taking a first inspection object that is one of the plurality of inspection objects, subsequently performs the singular portion detection processing on a second work inspection image obtained by image-taking, after the first inspection object, a second inspection object that is one of the plurality of objects and different from the first inspection object, and subsequently performs the singular portion detection processing on a third work inspection image obtained by image-taking, after the second inspection object, a third inspection object that is one of the plurality of objects and different from both of the first inspection object and the second inspection object.

According to a second aspect of the present invention, there is provided an image processing method, comprising: an image-taking step of sequentially image-taking a plurality of inspection objects as inspection targets; a step of acquiring a work inspection image of one image-taken inspection object among the plurality of inspection objects in the image-taking step; a step of acquiring a work reference image that is different from the work inspection image and used to inspect the one inspection object; a step of generating an aligned image by arranging the work reference image at the periphery of the work inspection image; and a processing step of subjecting the aligned image to singular portion detection processing to detect a singular portion in the aligned image, wherein the processing step performs the processing on the aligned image including a first work inspection image obtained by image-taking a first inspection object among the plurality of inspection objects in the image-taking step, subsequently performs the processing on the aligned image including a second work inspection image obtained by image-taking, after the first inspection object, a second inspection object that is different from the first inspection object and one of the plurality of objects, and subsequently performs the processing on the aligned image including a third work inspection image obtained by image-taking, after the second inspection object, a third inspection object that is different from both of the first inspection object and the second inspection object and one of the plurality of objects.

According to a third aspect of the present invention, there is provided a non-transitory computer-readable storage medium which stores a program for allowing a computer to function as an image processing apparatus, the image processing apparatus comprising: a unit configured to acquire a work inspection image by image-taking one inspection object among a plurality of sequentially image-taken objects; a unit configured to acquire a work reference image that is different from the work inspection image and used to inspect the one inspection object; a unit configured to generate an aligned image by arranging the work reference image at the periphery of the work inspection image; and a processing unit configured to subject the aligned image to singular portion detection processing to detect a singular portion in the aligned image, wherein the processing unit performs the singular portion detection processing on a first work inspection image obtained by image-taking a first inspection object that is one of the plurality of inspection objects, subsequently performs the singular portion detection processing on a second work inspection image obtained by image-taking, after the first inspection object, a second inspection object that is one of the plurality of objects and different from the first inspection object, and subsequently performs the singular portion detection processing on a third work inspection image obtained by image-taking, after the second inspection object, a third inspection object that is one of the plurality of objects and different from both of the first inspection object and the second inspection object.

Further features of the present invention will become apparent from the following description of exemplary embodiments (with reference to the attached drawings).

BRIEF DESCRIPTION OF THE DRAWINGS

FIG. 8 illustrates one example of a work inspection image;

FIGS. 9A and 9B show an aligned image and the result of performing a singular portion extraction processing;

FIGS. 10A and 10B show the aligned image and the result of performing the singular portion extraction processing;

FIGS. 11A and 11B show the aligned image and the result of performing the singular portion extraction processing;

FIGS. 12A and 12B show the aligned image and the result of performing the singular portion extraction processing;

FIGS. 14A and 14B illustrate the aligned image and the result of performing the singular portion extraction processing; and FIGS. 15A and 15B illustrate the aligned image and the result of performing the singular portion extraction processing.

DESCRIPTION OF THE EMBODIMENTS

Figure 1:
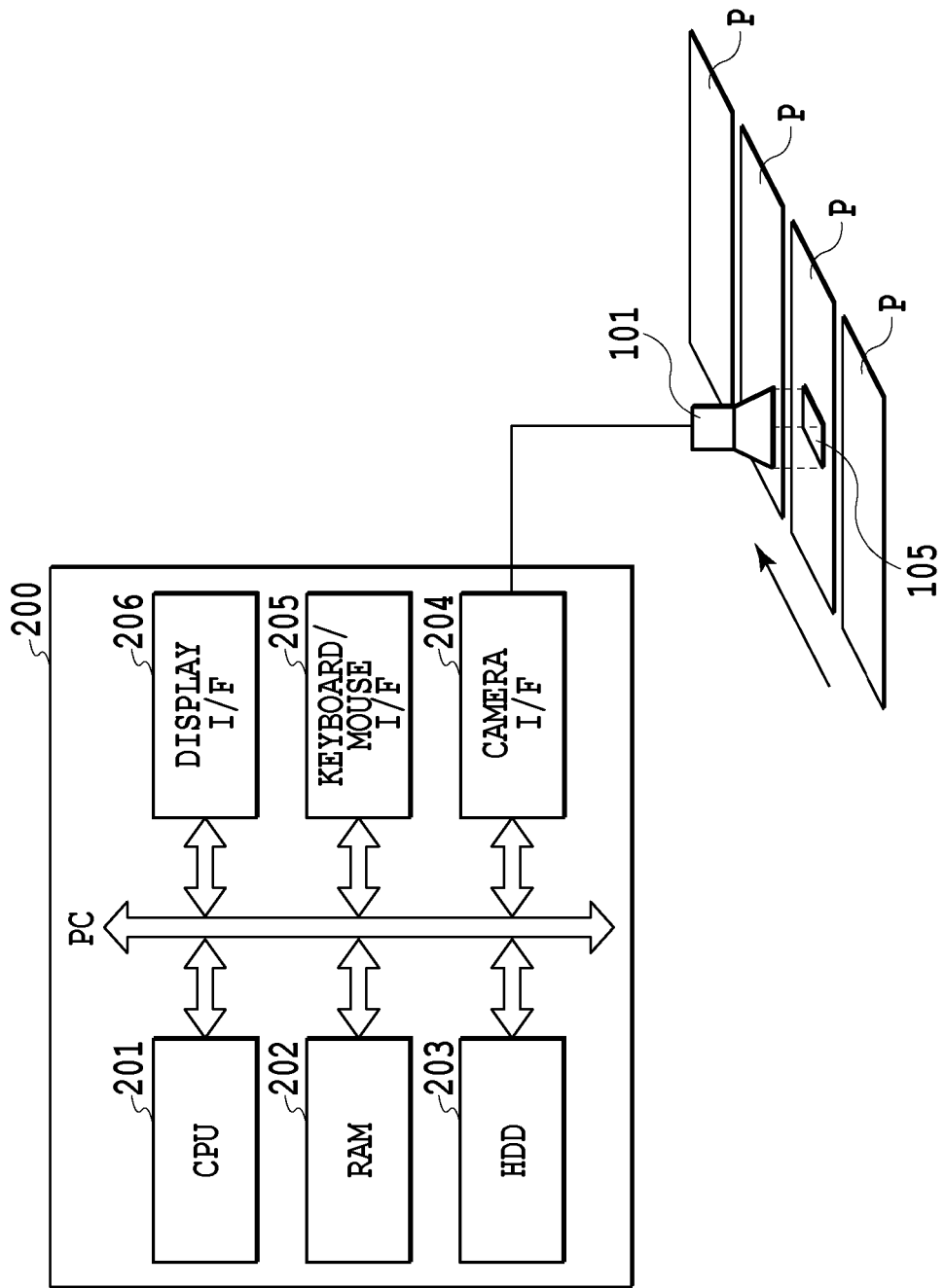
FIG. 1 is a diagrammatic illustration illustrating an inspection system that can be used in the present invention.

FIG. 1 is a diagrammatic illustration of an inspection system that can be used in the present invention. This system is mainly composed of an image processing apparatus 200, a plurality of sheet-like inspection objects P, and a camera 101 to image-take the predetermined position of an individual object P. The plurality of objects P are carried at a fixed speed in the arrow direction. The image processing apparatus 200 extracts a defect (singular portion) of an object P based on an image obtained by image-taking the object P.

A CPU 201 controls the entire system while using a RAM 202 as a work area based on a program retained in an HDD 203. For example, the CPU 201 controls the camera 101 connected via a camera I/F (interface) 204 to image-take the respective carried objects P to obtain images corresponding to the respective objects P. During this, the CPU 201 repeats image-taking operations at a timing at which an inspection target region 105 of the individual object P is placed in the image-taking region of the camera 101 and a cycle depending on the carrying speed to thereby store the resultant image in the RAM 202 sequentially. In a case where a carrying error for example causes an image-taking region to be displaced from the individual inspection target region 105, a pattern functioning as reference point for example may be printed on the object P in advance so that an image-taking operation is set at a timing at which the pattern is detected as a reference. The camera 101 can be connected to the camera I/F by a CameraLink, USB, IEEE1394, or LAN for example. Although the shown configuration uses the camera 101, the camera 101 can be substituted with a scanner including a line sensor. In the shown case, a region that can be image-taken by one image-taking operation by the camera 101 is similar to the inspection target region 105 of the sheet P. However, when a region that can be taken in one shot is smaller than the inspection target region 105, then one sheet P may be subjected to a plurality of image-taking operations to connect the resultant images.

A keyboard/mouse I/F 205 is an I/F to control an HID (Human Interface Device) such as a not-shown keyboard or mouse. An operator can input inspection-related information via the information keyboard/mouse I/F 205. A display I/F 206 is an I/F that controls the display on a not-shown display. The operator can confirm the inspection status or result for example via the display I/F 206.

Figure 2:
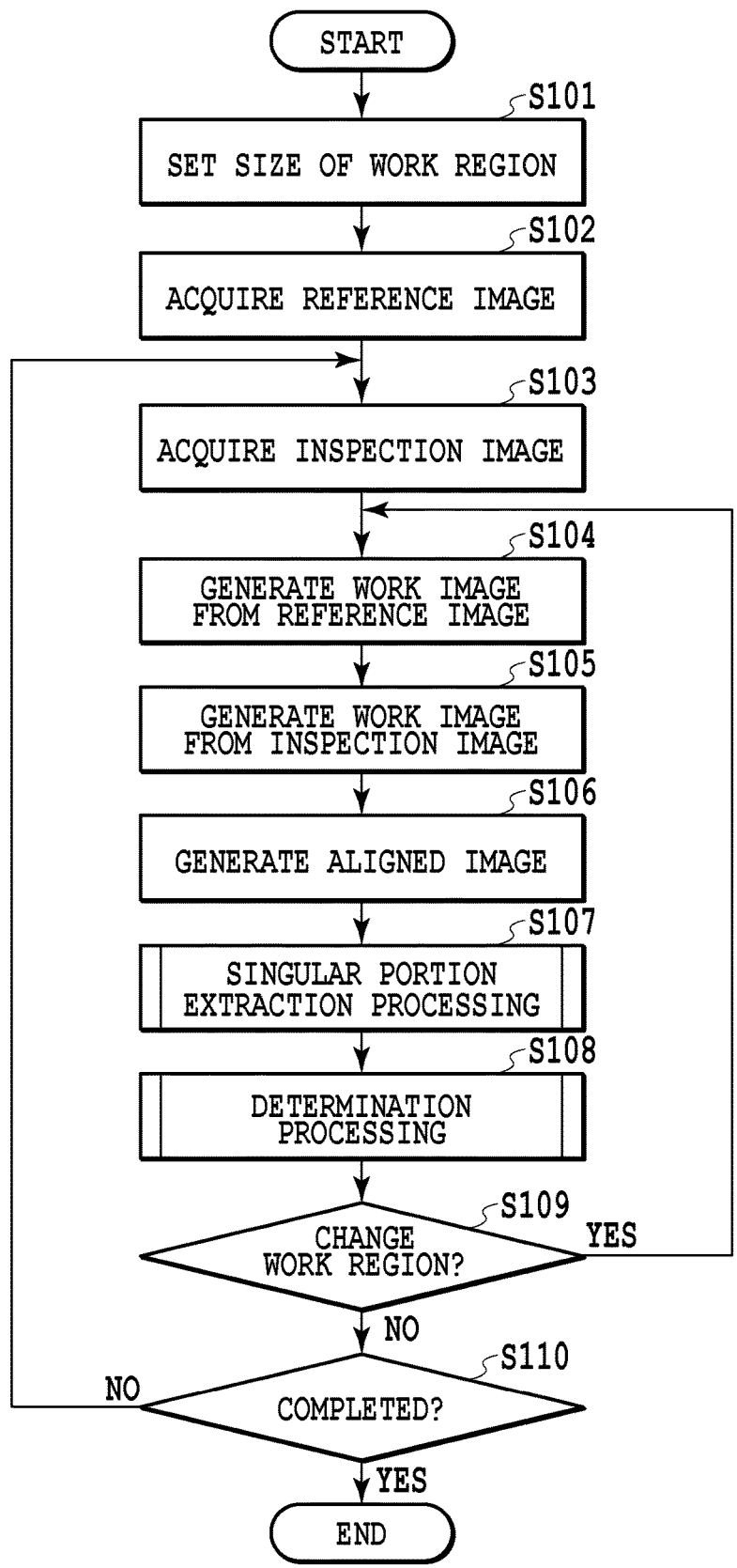
FIG. 2 is a flowchart for explaining a singular portion detection step.

FIG. 2 is a flowchart for explaining the singular portion detection step executed by the CPU 201 in the image processing apparatus 200. When this processing is started, then the CPU 201 sets the size of a work image in Step S101. The work image means an image, among inspection target images obtained by image-taking the inspection target region 105 of the object P, an image assumed as one target of the characteristic inspection processing of the present invention as later described in Step S107 and Step S108. The CPU 201 sets the size of a work image based on an expected size of a singular portion or the resolution of the camera 101 for example. However, this setting also can be performed based on an instruction from the operator.

Figure 3A:
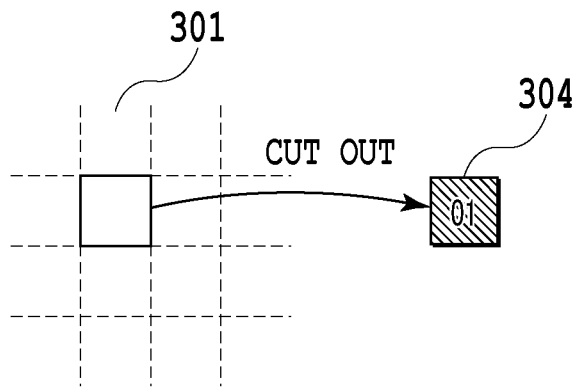
FIGS. 3A to 3C are a schematic view for explaining an aligned image generation method.
Figure 3B:
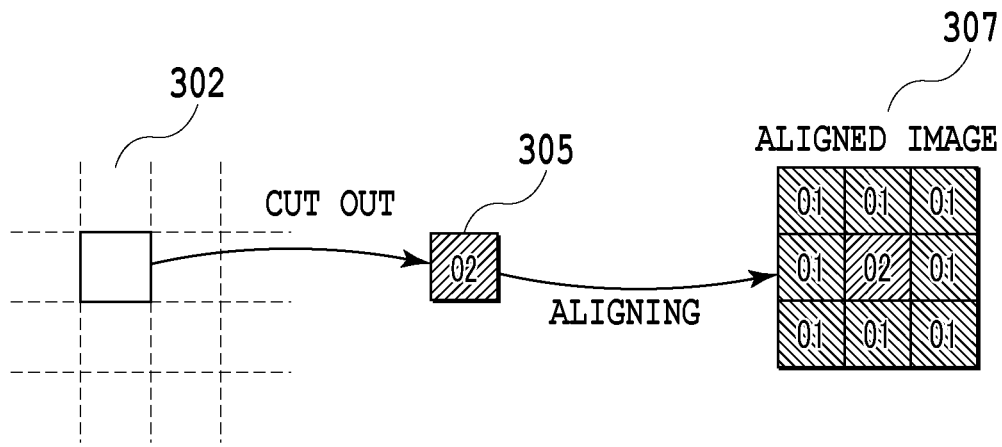
Figure 3C:
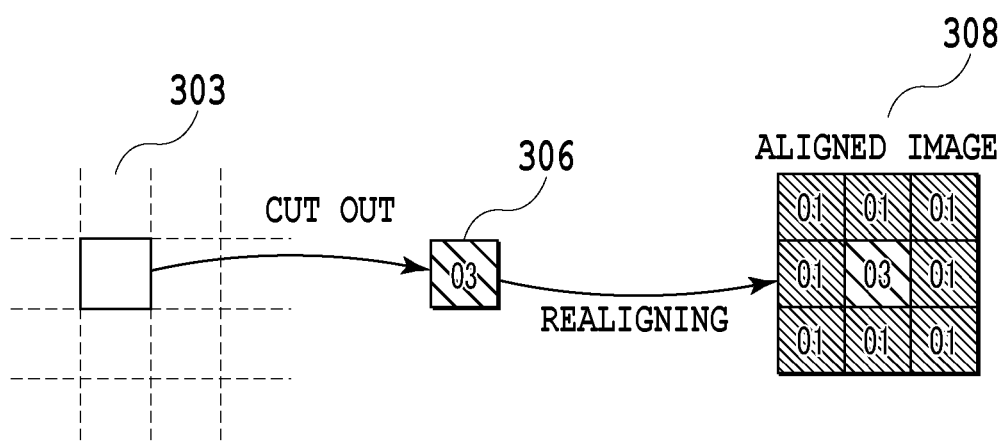

Next, in Step S102 to Step S106, the CPU 201 generates an aligned image 307. FIGS. 3A to 3C are a schematic view for explaining a method of generating the aligned image 307. The following section will describe, with reference to FIGS. 3A to 3C, steps to generate the aligned image 307 based on Step S102 to Step S106.

First, in Step S102, the CPU 201 acquires a reference image 301. Here, the inspection target region 105 of the object P(S) firstly carried to the lower side of the camera 101 after the start of this processing is image-taken and the resultant image is used as the reference image 301. In the present invention, the reference image 301 is an image used in order to determine whether or not an inspection target image includes a singular portion by comparing the image with the inspection target image.

In Step S103, the CPU 201 acquires an inspection target image 302. Specifically, the CPU 201 image-takes the inspection target region 105 of the object P(1) as an inspection target and set the resultant image as the inspection target image 302.

In Step S104, the CPU 201 cuts the reference image 301 acquired in Step S102 to have a work image size set in Step S101 to generate a work reference image 304 (FIG. 3A). In Step S105, CPU 201 cuts the inspection target image 302 acquired in Step S103 to have a work image size to generate a work inspection image 305 (FIG. 3B). During this, the work reference image 304 obtained in Step S104 and the work inspection image 305 obtained in Step S105 are cut from the respective same coordinate positions of the reference image 301 and the inspection target image 302 so as to correspond to the same position of the inspection target region 105.

Next, in Step S106, the CPU 201 causes the work reference image 304 obtained in Step S104 to be aligned with the work inspection image 305 obtained in Step S105 to generate the aligned image 307. As shown in FIG. 3B, the aligned image 307 is generated by arranging the same work reference images 304 abutted to one work inspection image 305 in 8 directions.

In Step S107, the CPU 201 subjects the aligned image 307 generated in Step S106 to the singular portion extraction processing using the processing of peripheral vision and involuntary eye movement during fixation. The specific method of this processing will be described in detail later.

In Step S108, a determination processing is performed based on the result of the singular portion extraction processing in Step S107. The determination processing is not limited to a particular method and may use known processing such as the one to perform the defect determination based on the brightness image after the singular portion extraction processing.

In Step S108, after the work inspection image 305 is subjected to the extraction and determination processing, then the CPU 201 proceeds to Step S109 to determine whether or not the inspection target image 302 includes a work inspection image not yet subjected to the processing. If it is determined that there is a work inspection image not yet subjected to the processing, the processing returns to Step S104 in order to subject the next work target image to the processing (FIG. 3C). If the inspection target image 302 does not include a work inspection image not yet subjected to the processing on the other hand, then it is determined that the inspection for the object image-taken in Step S103 is completed and the processing proceeds to Step S110.

In Step S110, the CPU 201 determines whether the object P to be inspected exists or not. When the object P exists, then the processing proceeds to Step S103 to perform the image-taking operation for the next object. In a case where it is determined that an object to be inspected already does not exist, then this processing is completed.

An embodiment has been described above in which a plurality of the work inspection images 305 are generated from one inspection target image 302 and a plurality of the work reference images 304 are generated from one reference image 301. However, this embodiment is not limited to such an embodiment. Another embodiment also may be used in which one work inspection image 305 is generated from one inspection target image 302 and one work reference image 304 is generated from one reference image 301. A plurality of the work inspection images 305 generated from one inspection target image 302 also may include mutually-superposed regions.

Figure 4:
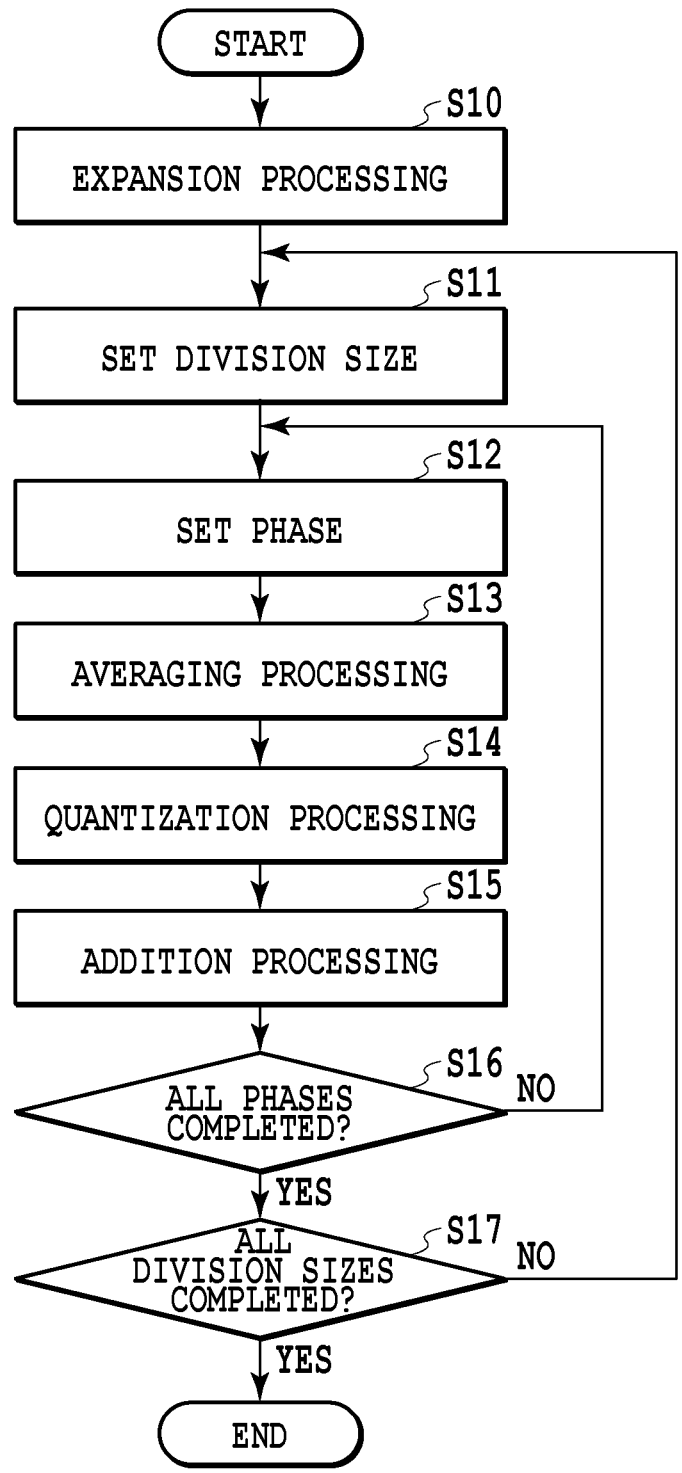
FIG. 4 is a flowchart for explaining a singular portion extraction processing.

FIG. 4 is a flowchart for explaining the details of the singular portion extraction processing executed in S107. When this processing is started, the CPU 201 in Step S10 firstly subjects the aligned image 307 generated in Step S106 to an expansion processing so that the entire area of the aligned image 307 can be correctly subjected to the processing of peripheral vision and involuntary eye movement during fixation, thereby generating the processing target image 1001. The expansion processing will be described in detail later.

Next, in Step S11, the CPU 201 sets one division size from among a plurality of division sizes prepared in advance. In Step S12, one phase of dividing position in the aligned image is set from among a plurality of phases prepared in advance to correspond to the division sizes set in Step S11. The plurality of division sizes and the plurality of phases corresponding to the plurality of division sizes are prepared in advance based on the work image size set in Step S101. In the case of this embodiment, due to the characteristic of the processing, the division size is set to a size similar to the work image size or a size larger or smaller by 10% than the work image size.

Figure 5A:
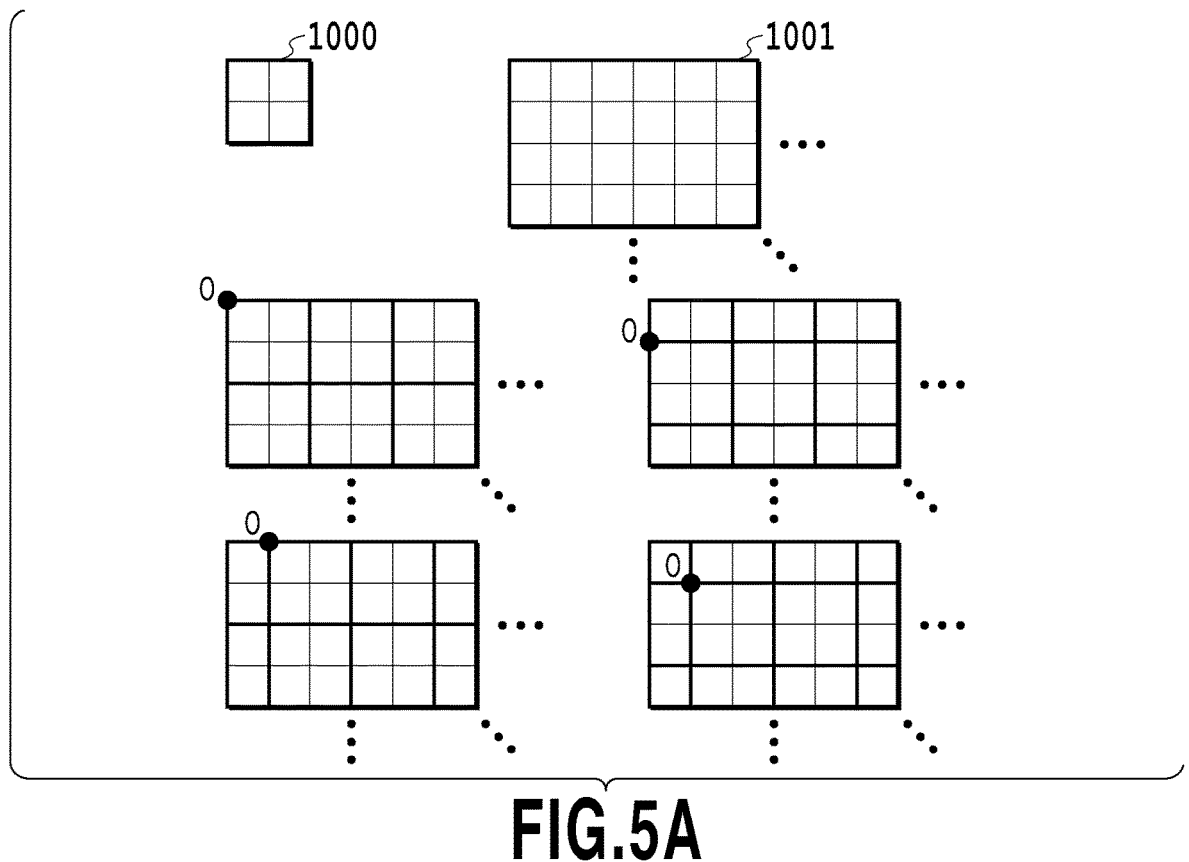
FIGS. 5A and 5B illustrate a division status of an inspection target image.
Figure 5B:
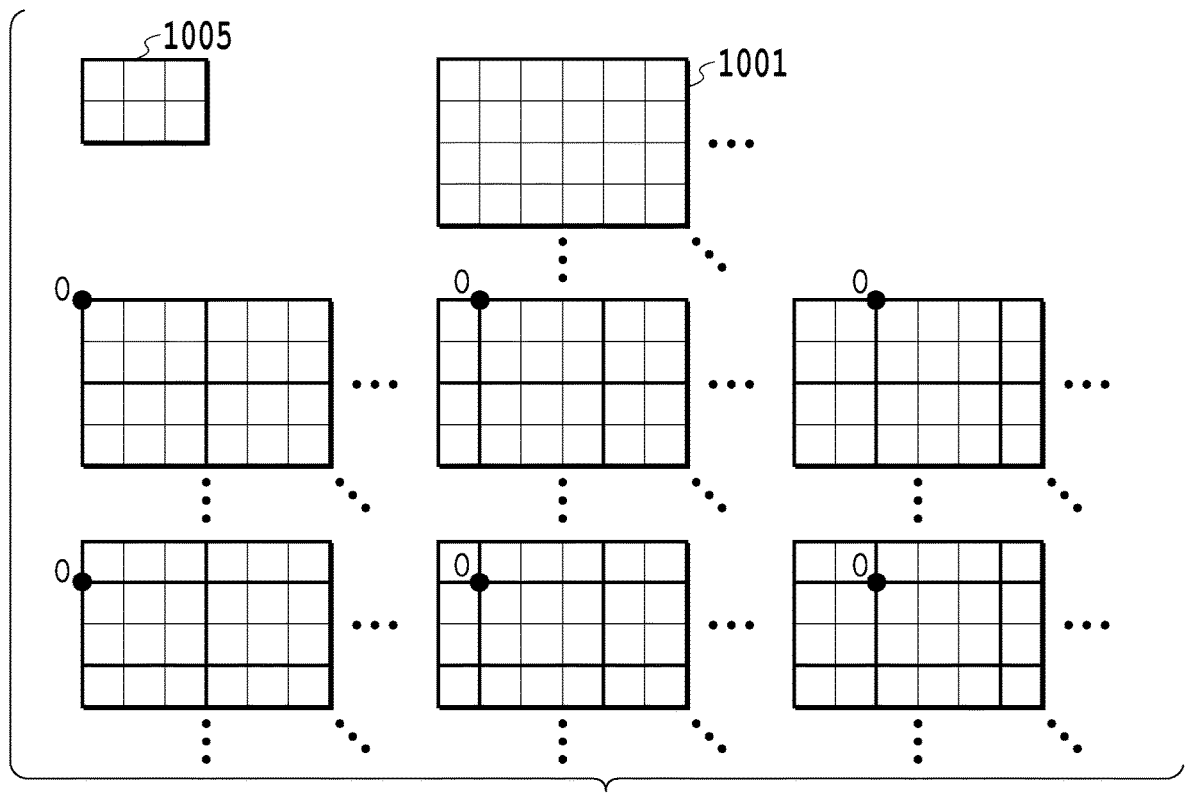

FIGS. 5A and 5B illustrate the division example of a processing target image 1001 based on the division size and phases. FIG. 5A shows a case where the division size is 2×2 pixels and FIG. 5B shows a case where the division size is 3×2 pixels, respectively. In a case where the division size 1000 is 2×2 pixels as shown in FIG. 5A, the processing target image 1001 is divided based on 2×2 pixels as a unit and can be divided in four ways as shown in 1002 to 1005. in a case where the division size 1005 is set to 3×2 pixels as shown in FIG. 5B, the processing target image 1001 can be divided in six ways as shown in 1006 to 1011 having six phases. Generally, in the case of a division region having Sx pixels in the X direction and Sy pixels in the Y direction, the phase number is Sx×Sy. In this embodiment, for each of the division regions, averaging, quantizing, and adding are performed while sequentially changing the phase.

Returning to FIG. 4, in Step S13, based on the division size set in Step S11 and the phase set in Step S12, the processing target image 1001 generated in Step S10 is divided as shown in FIGS. 5A and 5B to perform the averaging processing. Specifically, with regard to a plurality of pixels included in the respective divided regions, an average value of the brightness data of the individual pixels is calculated. The brightness data corresponding to the individual pixels also may be obtained by averaging the brightness value (any value of 0 to 255) of the respective pieces of RGB data owned by the pixel. Alternatively, the brightness data also may be obtained as a value obtained by multiplying the respective pieces of RGB data with a predetermined weighting coefficient to subsequently add the respective values. Alternatively, the brightness data of any one color of the respective R, G, and B also may be directly used as the pixel brightness data. Instead of the average value, the median value of a plurality of pixels in the division region also may be used.

In Step S14, the average value of the respective division regions calculated in Step S13 is quantized for each pixel. Specifically, the median value of the brightness of the entire processing target image 1001 is used as a threshold value. The threshold value is compared with the individual average value to output a value of 1 or 0. Although the binarization processing is used in this embodiment, a quantization processing such as ternarization or more also can be used.

In Step S15, the quantization value obtained in Step S14 is added to an addition image data. The addition image data is image data showing the result of adding quantization values of the case where the division sizes and the phase are different, respectively and having an initial value of 0. When the quantization value obtained in Step S14 has the first phase of the first division size, then the addition image data obtained in Step S15 is equal to the quantization data obtained in Step S14.

Next, in Step S16, the CPU 201 determines whether all phases for the currently-set division size are completely subjected to the processing or not. If it is determined that there is still a phase to be processed, then the processing returns to Step S12 to set the next phase. If it is determined that all phases are completely processed on the other hand, then the processing proceeds to S17.

Figure 6:
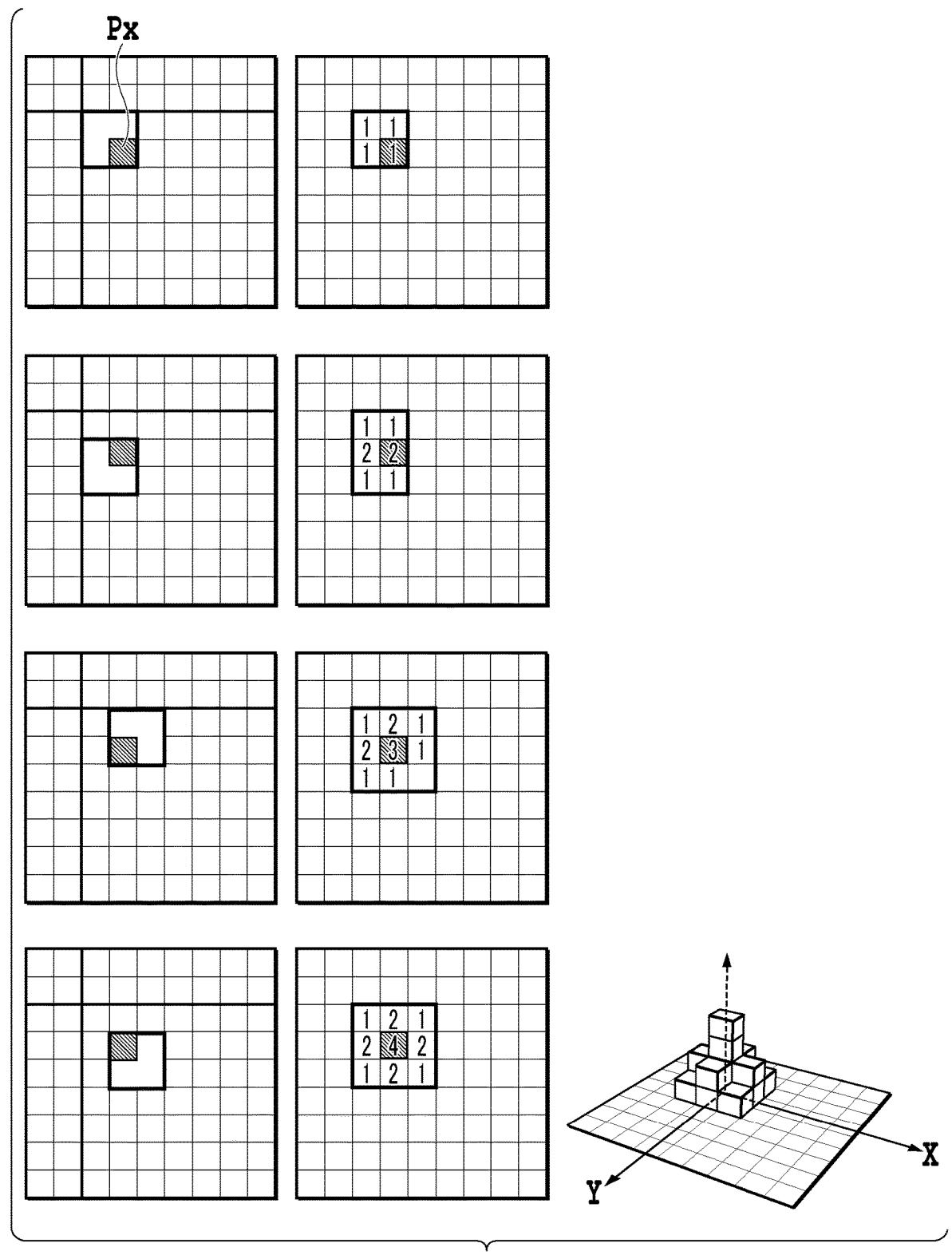
FIG. 6 is a schematic view of the process of an addition processing.

FIG. 6 shows a process of sequentially subjecting, in a case where the division size set in Step S11 is 2×2 pixels shown in FIG. 5A, to the addition processing of Step S15 for all phases. In a case where the division size is 2×2 pixels, there are four phases as described in FIG. 5A. The numbers shown in FIG. 6 show, in the process of sequentially changing these four phases, the addition number for using binary data of the peripheral pixels for the addition processing of the target pixel Px. As shown in FIG. 6, since the target pixel Px itself is used for all phases included in the division region, the target pixel Px has the highest addition number, thus having the highest contribution to the addition result. A pixel farther away from the target pixel Px has a lower addition number, thus having smaller contribution to the addition result.

Returning to the flowchart of FIG. 4, in Step S17, the CPU 201 determines whether all of division sizes prepared in advance are completely processed or not. If it is determined that there is still a division size to be processed, then the processing returns to Step S11 to set the next division size. If it is determined that all of the division sizes are completely processed on the other hand, then this processing is completed and returns to the flowchart of FIG. 2.

The following section will describe the expansion processing executed in Step S10. As described in FIG. 6, in the processing of peripheral vision and involuntary eye movement during fixation of this embodiment, the addition data is calculated based on the average value of all pixels included in a division region moving around the target pixel Px as a center. Thus, with regard to a target pixel positioned at an end of the processing target image 1001, a division region includes a region not including data, which undesirably prevents a correct processing.

However, Step S108 of this embodiment may determine whether the work inspection image 305 includes a unique point or not. Thus, it is only required that the processing of peripheral vision and involuntary eye movement during fixation of Steps S12 to S17 is performed correctly for the entire area of the aligned image 307. For this purpose, in the expansion processing S10 of this embodiment, a region necessary and sufficient to correctly perform the processing of peripheral vision and involuntary eye movement during fixation to the entire aligned image 307 is added to the further periphery of the aligned image 307.

Figure 7A:
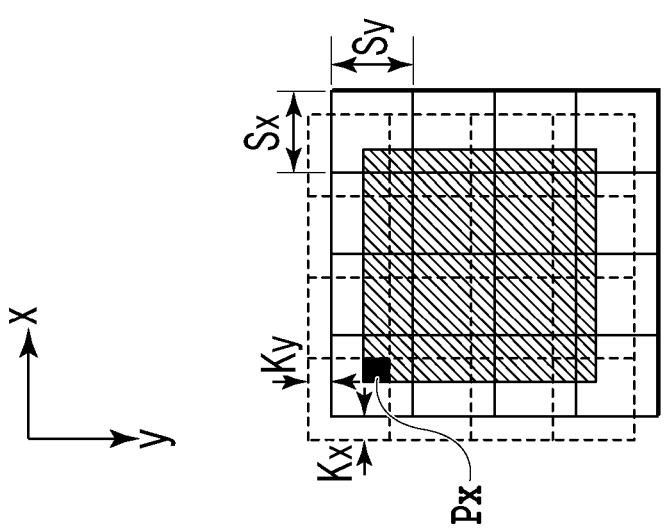
FIGS. 7A to 7C are illustration for explaining an expansion processing.
Figure 7B:
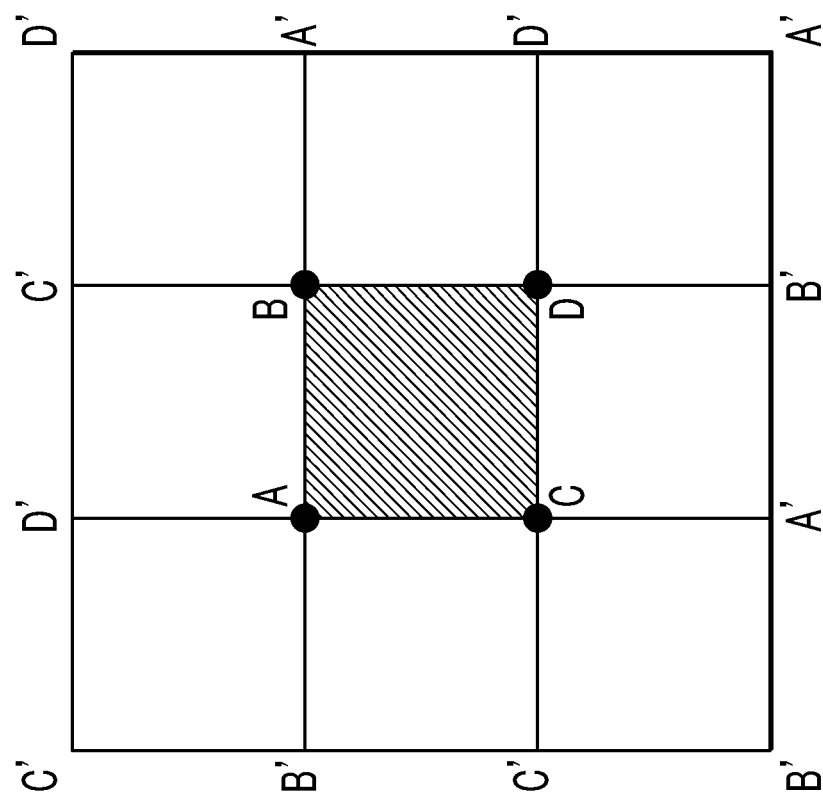
Figure 7C:
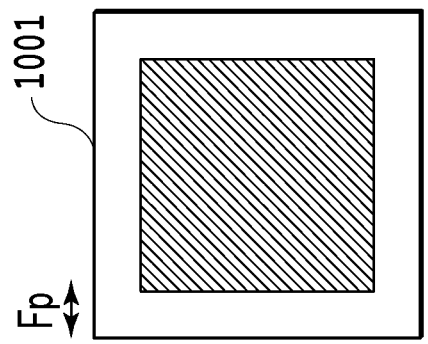

FIGS. 7A to 7C illustrate the expansion processing according to this embodiment. In the drawings, a region corresponding to the aligned image 307 is shown by the diagonal lines. As shown in FIG. 7A, when the target pixel Px is positioned at a corner of the inspection target region, then a division region around the target pixel Px as a center (solid line) and a division region having a phase dislocated therefrom (dotted line) undesirably include a region not including data (white region). To solve this, in the expansion processing of Step S10, dummy data is added around the pixel Px positioned at the corner so that even in a case the pixel Px in a division region having the maximum division size and the maximum phase, the region can include reasonable data.

FIG. 7B illustrates a method of generating the dummy data. Four images are generated by inverting the aligned image in a point-symmetric manner with respect to the respective vertexes A, B, C, and D and four images are generated by inverting the aligned image in a line-symmetric manner with respect to the respective sides AB, BC, CD, and DA These eight images surround the aligned image. In this embodiment, a region surrounded by A', B', C', and D' thus prepared also can be used as the processing target image 1001. From the viewpoint of the load reduction however, the processing target image preferably has a smaller size. For example, when assuming that the maximum division size in the processing of peripheral vision and involuntary eye movement during fixation is (Sx, Sy) and the maximum travel distance is (Kx, Ky), such dummy data may be sufficient that is generated to have a size expanded to $Fp=(Sx/2)+Kx$ in the X direction and to $Fq=(Sy/2)+Ky$ in the Y direction. FIG. 7C shows the processing target image 1001 to which the dummy data is added in the manner as described above.

FIGS. 8 to 12B are a diagram to specifically explain the processing status when a series of singular portion detection steps described in FIG. 2 is performed. FIG. 8 shows one example of the work inspection image 305 generated in Step S105. A brightness image is shown that has a region having 20 pixels in the X direction and 20 pixels in the Y direction.

FIGS. 9A and 9B show the aligned image generated in Step S106 and the result of subjecting the aligned image to the singular portion extraction processing in Step S107. Here, a case is shown in which an image equivalent to the work inspection image shown in FIG. 8 is used as a work reference image. Since the work inspection image is the same as the work reference image, the result of performing the processing of peripheral vision and involuntary eye movement during fixation shows a uniform image as shown in FIG. 9B. When such an image is obtained, Step S108 of FIG. 2 determines that there is no singular portion in the work inspection image as a target.

When Step S110 of FIG. 2 determines that there is still a to-be-inspected inspection object and the processing returns to Step S103, then the inspection target image obtained by image-taking an object P(2) of the second image-taking operation is different from the inspection target image obtained in the image-taking operation of the previous Step S103. Thus, in the subsequent Step S105, a newly-acquired inspection target image is cut to generate a new work inspection image. Then, in Step S106, this new work inspection image is surrounded by the work reference images that are the same as the previous ones to thereby generate a new aligned image. After Steps S107 to S109 with regard to P(3), in a case where Step S110 determines that there is still a to-be-inspected inspection object again and then the processing returns to Step S103, an object P(4) is image-taken by the third round of image-taking operation of Step S103, and then Steps S107 to S109 are performed with regard to the obtained inspection image.

FIGS. 10A and 10B show a case where a new work inspection image includes therein a pinhole-like defect as in FIGS. 9A and 9B. As can be seen from the aligned image shown in FIG. 10A, a pinhole exists only in a work inspection image provided newly at the center. In the aligned image as shown in FIG. 10A, since the work inspection image is different from the work reference image, when the processing of peripheral vision and involuntary eye movement during fixation is performed, then a non-uniform image as shown in FIG. 10B is obtained. In this case, Step S108 of FIG. 2 determines the pinhole portion as a singular portion.

FIGS. 11A and 11B show a case where a work inspection image includes therein a linear defect as in FIGS. 10A and 10B. Even in such a case, Step S108 of FIG. 2 determines a portion shown by the white lines a singular portion.

FIGS. 12A and 12B show a case where the coordinate of the center work inspection image is displaced from the peripheral work reference image as in FIGS. 9A and 9B. Such a situation is caused in a case where the object manufacture step includes a print step for example and thus some defect causes a displaced print position. Even in such a case, since the work inspection image is different from the work reference image, the execution of the processing of peripheral vision and involuntary eye movement during fixation provides the non-uniform image as shown in FIG. 12B and this image is determined by Step S108 of FIG. 2 as a singular portion.

The determination result of Step S108 can be subsequently used for various applications. For example, in order to allow an operator to easily determine a singular portion in an inspection to find a singular portion in an image, the singular portion can be displayed in a popped-up manner. In this case, the operator can confirm the singular portion based on the popped-up image to determine a cause of the generation. Alternatively, a defect portion can be repaired or can be excluded as a defective product.

The extracted singular portion also can be automatically subjected to a detailed investigation without requiring the operator. For example, an object for which a singular portion is detected can be image-taken based on the camera 101 having different angle of view and focusing and a higher resolution. In this case, the resultant image can be subjected to a pattern matching with a normal component image prepared in advance to investigate the size or magnitude of the flaw. If the object is a printed matter, then it is also possible to confirm whether or not the singular portion is caused by paper dust, a defective print head, or defective conveying for example. The determination processing of Step S108 also can stop the inspection or manufacture operation itself depending on the determination result.

In the above configuration, the image of the firstly-carried object P is used as a reference image. Thus, there may be a case where the reference image itself includes therein a singular portion such as a defect. In such a case, when a singular portion is detected in the determination processing for the second object, the cause of the singular portion may be investigated via the operator or in an automatic manner so that the reference image can be changed. Alternatively, an object for which no flow is clearly confirmed may be prepared in advance and may be used as a reference image by setting the object at the top of the carriage to perform the above processing. The reference image also can be inputted to the image processing apparatus 200 in advance without an image-taking step.

In any case, according to this embodiment, when an image of an object can be image-taken, then an image required to inspect the object, i.e., an inspection target image composed of an inspection image and a reference image can be prepared. Thus, the inspection of the object does not require the image-taking operation of many objects other than the object, thus providing the manufacture, image-taking, and inspection result outputs with high responsiveness.

Second Embodiment

In the first embodiment, the image obtained by image-taking the firstly-carried object is used as a reference image common to a plurality of subsequently-carried objects. The second embodiment on the other hand uses images image-taken in advance for the respective plurality of objects to set reference images. The second embodiment also uses the inspection system shown in FIG. 1.

Figure 13:
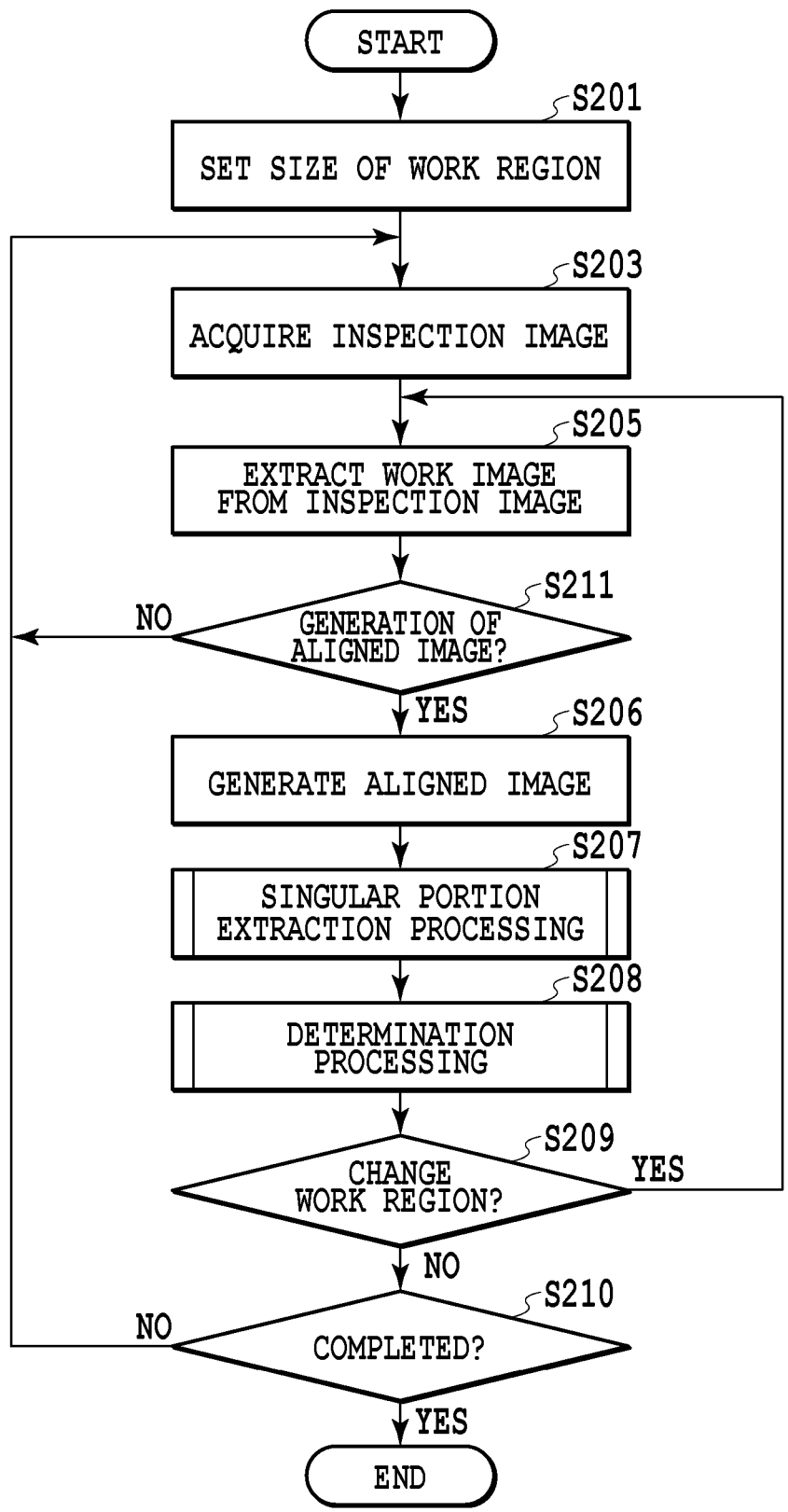
FIG. 13 is a flowchart illustrating the basic steps of the singular portion detection.

FIG. 13 is a flowchart to explain the basic steps of detecting a singular portion executed by the CPU 201 in this embodiment. Thus, the following section will describe only points different from those of the flowchart described for FIG. 2.

When a work image size is set in Step S201, then the CPU 201 proceeds to Step S203 to acquire the inspection target image 302. That is, the inspection target region 105 of the object P is image-taken and the resultant image is set as an inspection target image. Then, in Step S205, CPU 201 cuts the inspection target image acquired in Step S203 based on the work image size set in Step S201 to thereby generate the work inspection image.

Next, in Step S211, the CPU 201 determines whether or not an aligned image can be generated at the current stage, specifically, whether or not a work reference image for generating an aligned image can be prepared. In a case where the CPU 201 determines that a work reference image needed for generating an aligned image is insufficient, then the processing returns to Step S203 to image-take the next inspection object to thereby obtain a new inspection target image. In a case where the CPU 201 determines in Step S211 that an aligned image can be generated on the other hand, then the processing proceeds to Step S206 to generate an aligned image. The subsequent processing is the same as the one of the flowchart described for FIG. 2.

For example, in Step S211, the image acquired at the current stage is an image obtained by image-taking the top object only, then the CPU 201 returns to Step S203 to image-take the secondly-carried object to thereby obtain a work image of this object. At this stage, two types of work images are acquired. Thus, when the processing proceeds to the next Step S211, it is determined that an aligned image can be generated. Thus, the CPU 201 proceeds to Step S206 to generate the aligned image. This aligned image may be generated by allowing the firstly-acquired work inspection image to be surrounded by the secondly-acquired work inspection image or by allowing the secondly-acquired work inspection image to be surrounded by the firstly-acquired work inspection image. The important thing is that the former and the latter are similar images so that the uniform image as shown in FIG. 9B is obtained in the processing of peripheral vision and involuntary eye movement during fixation performed in Step S207 and a non-uniform image is obtained if the former and the latter have a difference therebetween.

Thereafter, an aligned image for a subsequently-carried object can be generated using the previously acquired plurality of work images. Although various generation methods may be used, one method for example may be used to use an image used as a reference image when the aligned image is firstly generated is continuously used as a common reference image as in the first embodiment. Alternatively, an image of an object carried before the inspection object can be used as a reference image for the inspection object for a predetermined number of times. In a case of the third round inspection for the third object P(3), an image obtained by image-taking the second object P(2) that is inspected just before P(3) can be used as a reference image. In a case of the fourth round inspection for the fourth object P(4), an image obtained by image-taking the third object P(3) that is inspected just before the fourth object P(4) can be used as a reference image. And also, in a case of inspections for P(3) and P(4) for example, an image obtained by image-taking P(2) can be used as a reference image commonly. Alternatively, an image that is obtained from the average value of the pixel values e.g., the brightness value of all objects or a plurality of objects carried prior to the inspection object also can be used as a reference image. This embodiment also can use any of the above methods.

By the way, the individual manufactured products in a manufacture line may gradually be different depending on a change of the environment. Specifically, if the environment temperature gradually increases in the situation to manufacture printed matters, there may be a case where an initially-manufactured printed matter has a lower image density (or higher brightness) than that of a printed matter manufactured after a certain period of time, for example. In such a case, if an image of an object carried just before the inspection object is used as a reference image for the inspection object as shown in FIG. 14A, then a reduced difference is caused therebetween, thus providing a higher probability of providing the uniform image as shown in FIG. 14B after the processing of peripheral vision and involuntary eye movement during fixation. However, when an image of an object carried remarkably long before the inspection object is used as a reference image for the inspection object as shown in FIG. 15A, then the difference therebetween is influenced by the temperature difference, thus causing a higher probability in which an image after the processing of peripheral vision and involuntary eye movement during fixation is not uniform as shown in FIG. 15B.

According to this embodiment, the two methods as described above can be used differently depending on the environment conditions or situation. Specifically, in order to exclude the temporal difference due to the environment change from detection targets, an image of an object carried just before (or at a time relatively just before) the inspection object may be used as a reference image for the inspection object. On the other hand, in order to include even the temporal difference due to the environment change in detection targets, then an image of an object carried relatively long ago than the inspection object may be used as a reference image for the inspection object.

In this embodiment, a plurality of reference images may be prepared for one inspection object to subject each reference image to the singular portion extraction processing. This can consequently provide the simultaneous extraction of both of a singular portion suddenly occurring in the manufacture line and a singular portion gradually occurring therein. Alternatively, the work inspection image obtained by image-taking one inspection object may be surrounded by work reference images obtained by being cut from a plurality of reference images to thereby generate an aligned image. As described above, in this embodiment, the reference image may be set depending on the characteristic or application of a to-be-detected singular portion.

The second embodiment as described above is similar to the first embodiment in that the inspection of the object does not require the image-taking operation of many objects other than the object, thus providing the manufacture, image-taking, and inspection result outputs with high responsiveness.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-087231 filed Apr. 25, 2016, which is hereby incorporated by reference wherein in its entirety.

What is claimed is:

1. An image processing apparatus, comprising one or more processors serving as:
   a unit configured to cut a work inspection image out of an inspection target image of one inspection object among a plurality of sequentially image-taken objects;
   an acquisition unit configured to cut, out of a reference image, a work reference image that is different from the work inspection image and used to inspect the one inspection object, wherein the work inspection image and the work reference image are cut from the respective same coordinate positions of the inspection target image and the reference image;
   a generation unit configured to generate an aligned image larger than the work inspection image by arranging the work reference image at the periphery of the work inspection image; and
   a processing unit configured to subject the aligned image to singular portion detecting processing to detect a singular portion in the aligned image,
   wherein the processing unit (i) performs the singular portion detection processing on the aligned image generated by the generation unit using a first work inspection image obtained by image-taking a first inspection object that is one of the plurality of inspection objects as the work inspection image, (ii) subsequently performs the singular portion detection processing on the aligned image generated by the generation unit using a second work inspection image obtained by image-taking, after the first inspection object, a second inspection object that is one of the plurality of inspection objects and different from the first inspection object as the work inspection image, and (iii) subsequently performs the singular portion detection processing on the aligned image generated by the generation unit using a third work inspection image obtained by image-taking, after the second inspection object, a third inspection object that is one of the plurality of inspection objects and different from both of the first inspection object and the second inspection object as the work inspection image.

2. The image processing apparatus according to claim 1, further comprising an image-taking unit configured to perform image-taking of the plurality of objects,
wherein the plurality of inspection objects are carried, at a predetermined speed, via a position at which the image taking by the image-taking unit is possible.

3. The image processing apparatus according to claim 1, wherein the acquisition unit acquires the work reference image from an image of an inspection object that is image-taken prior to the image taking of the one inspection object among the plurality of inspection objects.

4. The image processing apparatus according to claim 1, wherein the work reference image is an image of an inspection object firstly image-taken among the plurality of objects.

5. The image processing apparatus according to claim 1, wherein the acquisition unit acquires an image based on an image obtained by image-taking a certain inspection object among the plurality of objects as a work reference image for a work inspection image of an inspection object image-taken subsequent to the certain inspection object.

6. The image processing apparatus according to claim 1, wherein the work reference image for the work inspection image of a certain inspection object is generated from images of a plurality of inspection objects image-taken prior to the image taking of the certain inspection object among the plurality of inspection objects.

7. The image processing apparatus according to claim 1, wherein the work reference image is changed depending on a feature of a singular portion to be detected by the singular portion detection processing.

8. The image processing apparatus according to claim 1, wherein the singular portion detection processing is processing to detect a singular portion existing in the inspection object by performing averaging and quantizing processing on the respective plurality of division regions obtained by dividing the aligned image based on predetermined division size and predetermined phase in the aligned image to subsequently perform processing to add the results of the averaging and quantizing processing under conditions in which at least one of the division size and the phase varies.

9. The image processing apparatus according to claim 1, wherein the one or more processors further serve as a determination unit configured to determine, based on the result of the singular portion detection processing, whether the aligned image includes a singular portion or not.

10. The image processing apparatus according to claim 9, wherein in a case where the determination unit determines that the first work inspection image does not include a singular portion, then the first work inspection image is set as the work reference image in the singular portion detection processing for the second work inspection image and the third work inspection image.

11. An image processing method comprising:
an image-taking step of sequentially image-taking a plurality of inspection objects as inspection targets;
a step of cutting a work inspection image out of an inspection target image of one image-taken inspection object among the plurality of inspection objects in the image-taking step;
an acquisition step of cutting, out of a reference image, a work reference image that is different from the work inspection image and used to inspect the one inspection object, wherein the work inspection image and the work reference image are cut from the respective same coordinate positions of the inspection target image and the reference image;
a generation step of generating an aligned image larger than the work inspection image by arranging the work reference image at the periphery of the work inspection image; and
a processing step of subjecting the aligned image to singular portion detection processing to detect a singular portion in the aligned image,
wherein the processing step (i) performs the processing on the aligned image generated by the generation step using a first work inspection image obtained by image-taking a first inspection object among the plurality of inspection objects in the image-taking step as the work inspection image, (ii) subsequently performs the processing on the aligned image generated by the generation step using a second work inspection image obtained by image-taking, after the first inspection object, a second inspection object that is one of the plurality of inspection objects and different from the first inspection object as the work inspection image, and (iii) subsequently performs the processing on the aligned image generated by the generation step using a third work inspection image obtained by image-taking, after the second inspection object, a third inspection object that is one of the plurality of inspection objects and different from both of the first inspection object and the second inspection object as the work inspection image.

12. The image processing method according to claim 11, wherein the plurality of inspection objects are carried, at a predetermined speed, via a position at which the image taking by the image-taking step is possible.

13. The image processing method according to claim 11, wherein the work reference image is acquired from an image of an inspection object that is image-taken prior to the image taking for the work inspection image in the aligned image subjected to the processing step among the plurality of inspection objects.

14. The image processing method according to claim 11, wherein the work reference image is an image of an object firstly image-taken among the plurality of objects in the image-taking step.

15. The image processing method according to claim 11, wherein an image obtained by image-taking the first inspection object in the image-taking step is set as the work reference image arranged at the periphery of the second work inspection image obtained by image-taking subsequent to the first inspection object in the generation step.

16. The image processing method according to claim 11, wherein images of a plurality of inspection objects image-taken, from among the plurality of inspection objects, prior to the image taking of the inspection object in the image-taking step are arranged as the work reference image to generate an aligned image.

17. The image processing method according to claim 11, wherein the work reference image is changed depending on a feature of a singular portion to be detected by the singular portion detection processing.

18. The image processing method according to claim 11, wherein the singular portion detection processing is processing to detect a singular portion existing in the inspection object by performing averaging and quantizing processing on the respective plurality of division regions obtained by dividing the aligned image based on predetermined division size and predetermined phase in the aligned image to subsequently perform processing to add the results of the averaging and quantizing processing under conditions in which at least one of the division size and the phase varies.

19. A non-transitory computer-readable storage medium which stores a program for allowing a computer to function as an image processing apparatus, the image processing apparatus comprising:
  a unit configured to cut a work inspection image out of an inspection target image by image-taking one inspection object among a plurality of sequentially image-taken objects;
  an acquisition unit configured to cut, out of a reference image, a work reference image that is different from the work inspection image and used to inspect the one inspection object, wherein the work inspection image and the work reference image are cut from the respective same coordinate positions of the inspection target image and the reference image;
  a generation unit configured to generate an aligned image larger than the work inspection image by arranging the work reference image at the periphery of the work inspection image; and
  a processing unit configured to subject the aligned image to singular portion detection processing to detect a singular portion in the aligned image,
  wherein the processing unit (i) performs the singular portion detection processing on the aligned image generated by the generation unit using a first work inspection image obtained by image-taking a first inspection object that is one of the plurality of inspection objects as the work inspection image, (ii) subsequently performs the singular portion detection processing on the aligned image generated by the generation unit using a second work inspection image obtained by image-taking, after the first inspection object, a second inspection object that is one of the plurality of inspection objects and different from the first inspection object as the work inspection image, and (iii) subsequently performs the singular portion detection processing on the aligned image generated by the generation unit using a third work inspection image obtained by image-taking, after the second inspection object, a third inspection object that is one of the plurality of inspection objects and different from both of the first inspection object and the second inspection object as the work inspection image.

* * * * *